United States Patent Office.

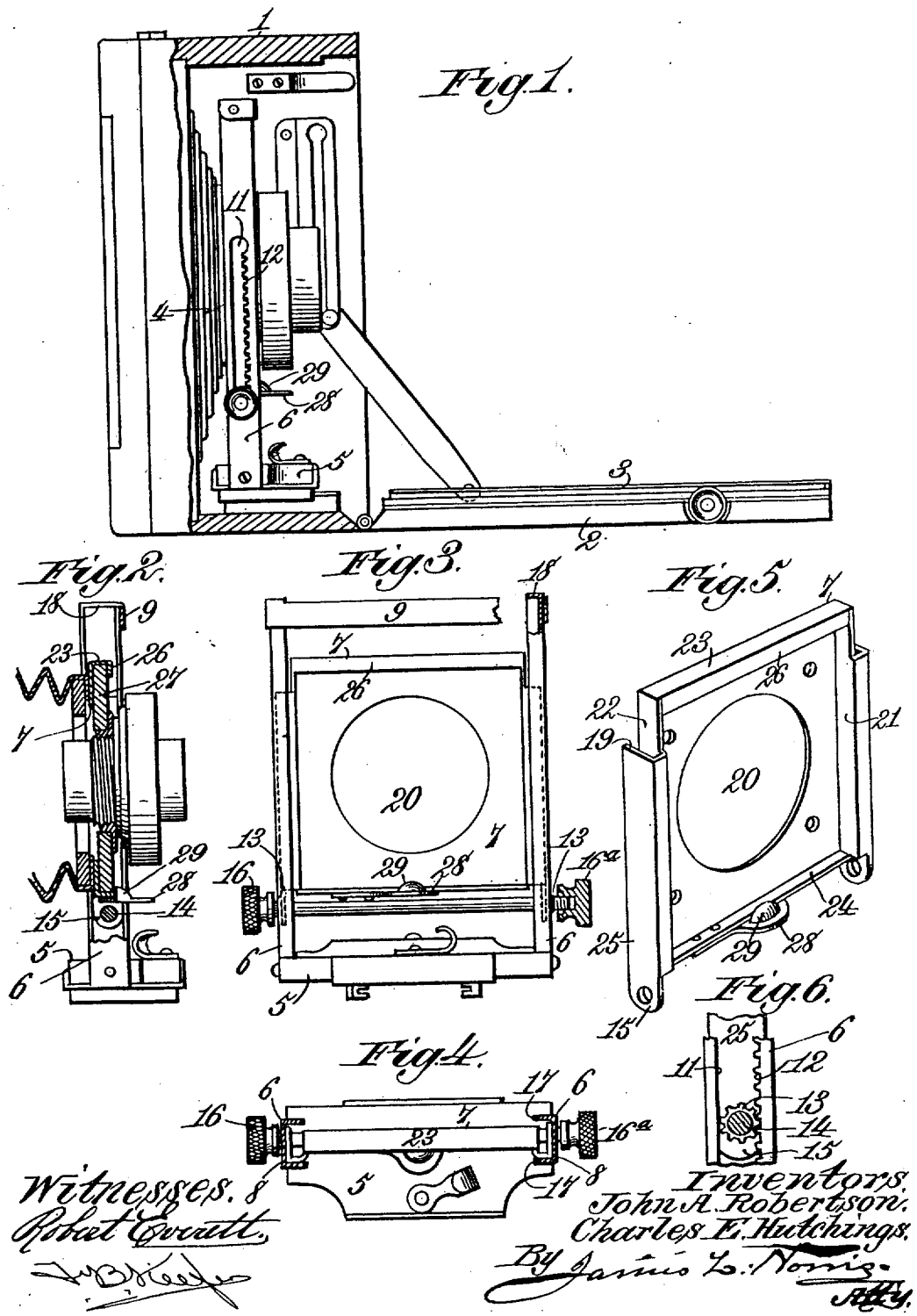

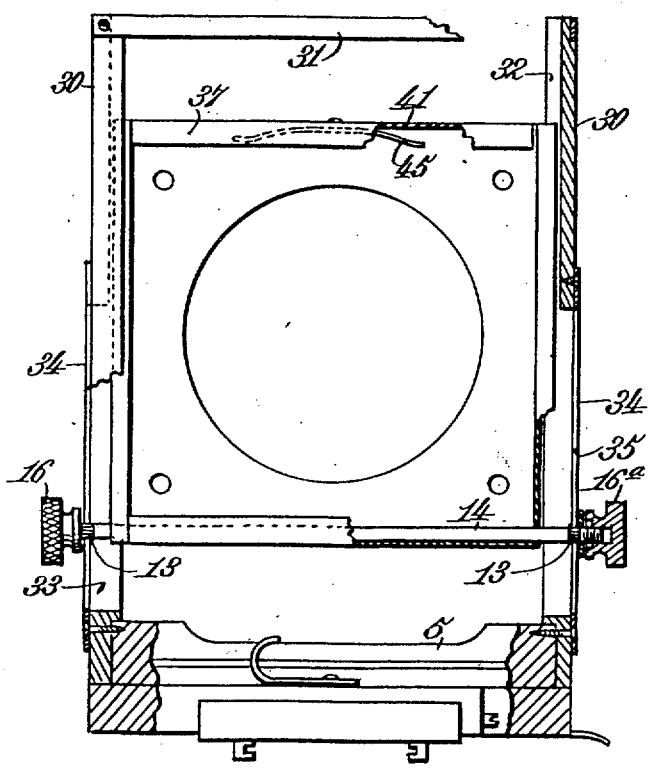

JOHN A. ROBERTSON AND CHARLES E. HUTCHINGS, OF ROCHESTER, NEW YORK, ASSIGNORS TO ROCHESTER OPTICAL AND CAMERA COMPANY, OF ROCHESTER, NEW YORK, A CORPORATION OF NEW YORK.

ADJUSTING MECHANISM FOR PHOTOGRAPHIC-CAMERA FRONTS.

SPECIFICATION forming part of Letters Patent No. 716,108, dated December 16, 1902.

Application filed April 4, 1902. Serial No. 101,402. (No model.)

*To all whom it may concern:*

Be it known that we, JOHN A. ROBERTSON and CHARLES E. HUTCHINGS, citizens of the United States, residing at Rochester, in the county of Monroe and State of New York, have invented new and useful Improvements in Adjusting Mechanism for Photographic-Camera Fronts, of which the following is a specification.

Our invention relates to photographic cameras, the object of the same being to provide novel means for vertically adjusting the camera-front or the lens-carrier forming part of the same.

A further object of the invention is to provide novel means for inserting the lens-board into the lens-carrier, retaining it in place therein, and readily removing the same.

Other objects of the invention will be hereinafter more fully set forth, and that which we regard as new will be pointed out in the claims.

In the drawings forming part of this specification, Figure 1 is a side elevation, partly in section, of a photographic camera embodying our improvements. Fig. 2 is a vertical central section of the camera-front. Fig. 3 is a front elevation of the same, partly broken away. Fig. 4 is a sectional plan view of the same. Fig. 5 is a detail perspective view of the lens-carrier. Fig. 6 is a detail sectional view of the rack and pinion for adjusting the front. Fig. 7 is a sectional front elevation of a modified construction of camera-front. Fig. 8 is a sectional side elevation of the same. Figs. 9, 10, and 11 are views of details of construction.

Like reference-numerals indicate like parts in the different views.

The camera-box 1, the cover 2, which when thrown outwardly into horizontal position serves as the bed, the runway 3 thereon, and the bellows 4 may be of any suitable or preferred construction. The camera-front is made up of the base-piece 5, adapted to be moved back and forth on the runway 3, the vertical guides 6, and the lens-carrier 7, secured to the forward end of the bellows 4 and slidingly mounted and vertically adjustable in the guides 6. The base 5 of the camera-front may be provided with any suitable means whereby it may be moved back and forth on and locked in adjusted position to the runway 3. The guides 6 consist of vertically-disposed parallel uprights secured to the opposite ends of the base-piece 5 and formed with inwardly-extending side flanges 8. The said uprights are preferably connected at their upper ends by a cross-piece 9, and the flanges 8 form between them the guideways in which the sides of the lens-carrier 7 are adapted to fit and move. The said uprights 6 are further provided with elongated slots 11, having along one of the edges thereof the racks 12. Meshing with the racks 12 are the pinions 13, both formed on or secured to the transverse shaft 14, extending through openings in the lips or ears 15, formed at the lower end of the lens-carrier 7 and provided on one end with a fixed handle 16. The opposite projecting end of said shaft is threaded to receive a binding-screw 16$^a$, adapted when screwed up to engage the outer surface of the adjacent guide 6 to lock the shaft 14 against turning movement, and consequently lock the lens-carrier against vertical displacement. The handle 16 has been shown in the form of a milled head or button, although it is obvious that any other suitable means whereby the shaft 14 may be rotated may be substituted therefor. The shaft 14 by this construction is located beneath the lower edge of the lens-carrier 7, so that it is out of the way and does not interfere with or project from the adjacent parts. Furthermore, the pinions 13 on the shaft 14, which mesh with the racks 12 in the slots 11, are out of the way and do not present projecting parts to interfere with the operation of the camera or present an unsightly or awkward appearance. When it is desired to raise or lower the lens-carrier 7 and the forward end of the bellows 4, to which the same is attached, it is merely necessary to loosen the binding-screw 16$^a$ and grasp the handle 16 and turn the shaft 14 in one direction or the other. This causes the upward or downward movement of the lens-carrier in the guides 6 in a direct vertical line, and when the proper position is reached said lens-carrier is locked against movement in any direction by the binding-screw 16ª.

The two uprights which constitute the guides 6 are preferably constructed in a single piece from sheet metal, the flanges 8 being seated in slits or kerfs 17 in the side edges of the wooden base-piece 5, and the upper ends of said uprights having inwardly-extending flanges 18, lying at right angles to the flanges 8 and serving as stops for limiting the upward movement of the lens-carrier, the said stops being engaged by corresponding projections 19 on the side edges of said lens-carrier. The lens-carrier 7 is also preferably made in a single piece from sheet metal, the rectangular blank from which the same is constructed having a central opening 20 therein and having the side edges thereof bent forwardly at right angles to form the flanges 21, 22, 23, and 24, which flanges produce in the front face of the lens-carrier a rectangular recess or pocket. The two side flanges 21 and 22 are bent outwardly and rearwardly to form the lateral wings 25, which fit and move within the guideways in the uprights 6, and said wings are cut away at their upper ends to form the projections 19. They are also extended downwardly at their lower ends to form the ears 15, through which the shaft 14 projects. The upper flange 23 is provided with an overhanging or depending lip or projection 26.

In connection with the parts just described we employ a removable lens-board 27, corresponding in shape with the rectangular recess or pocket in the front of the lens-carrier 7 and adapted to fit therein. To retain said lens-board in said pocket or recess, we provide beneath the lower horizontal flange 24 of the lens-carrier a spring fastening device 28, the same consisting of a strip of sheet metal secured at one end to the said flange 24 and having a beveled projection or engaging portion 29, which extends up to a point above the level of the upper surface of said flange 24. When it is desired to introduce the lens-board 27 into the lens-carrier, the upper edge of the same is inserted into the recess or pocket in the front of the lens-carrier behind the overhanging lip or projection 26. The lower edge of the same is then snapped back into place and is locked against displacement by the engaging portion 29 on the spring-clasp 28, which bears against the outer or front surface of said lens-board at its lower edge. In snapping the lower end of said lens-board back into the recess or pocket in the lens-carrier it will of course be understood that the same rides over the inclined or beveled face of said engaging portion 29. When it is desired to remove the lens-board 27, it is merely necessary to depress the free end of the spring fastening device 28 and reverse the movements of the lens-board above described.

Instead of making the guides 6 and the cross-piece 9, which connects the same at their upper ends, in a single piece from sheet metal and bending said guides inwardly to form the flanges 8 we may construct said guides in the form of wooden uprights 30, secured at their lower ends to the base-piece 5 of the camera-front, connected at their upper ends by a metallic strip 31, corresponding in function with the cross-piece 9 and having along their inner edges vertical grooves 32, in which the side edges of the lens-carrier are adapted to fit and move. When the guides are thus constructed, the same are provided with elongated slots 33 and have secured to their outer faces opposite said slots the plates 34, having slots 35 therein registering with the slots 33 and having along one of their edges the racks 36. The pinions 13 on the shaft 14 mesh with the racks 36, and the device operates in a manner similar in all respects to that first above described. We may also vary the construction of lens-carrier above described and the means for retaining the lens-board in place therein—that is to say, the pocket or recess in the front of the lens-carrier may be provided at its upper end with a depending lip or projection 37, corresponding in all respects with the lip or projection 26, heretofore referred to, and the lower end of said pocket or recess may be provided with an upwardly-extending lip or projection 38. If desired, the form of lens-carrier just described may be constructed in a single piece from sheet metal, the blank from which the same is made being bent forwardly to form flanges 39, 40, 41, and 42, the said flanges defining the outer contour of the pocket or recess in the lens-carrier. The lip or projection 37 is formed on the flange 41, and the lip or projection 38 is formed on the flange 42. The side flanges 39 and 40 are bent outwardly to form the guides 43, which fit and move within the grooves 32 in the uprights 30, and the shaft 14, carrying the pinions 13, which mesh with the racks 36, extends through openings at the lower ends of the flanges 39 and 40 and is seated in the space between the lip 38 and the inner or base wall of the lens-carrier. The same is thus out of the way and presents no projecting parts to detract from the appearance of the device as a whole.

The lens-board 44 is adapted to fit within the pocket in the front of the lens-carrier, the same being of a width corresponding to the distance between the side flanges 39 and 40 and of a length slightly shorter than the distance between the flanges 41 and 42. It is therefore capable of being seated in said recess or pocket behind the lips or projections 37 and 38. To retain the same in place, we employ a spring 45, located out of sight behind the lip or projection 37, exerting its pressure downwardly and adapted to bear against the upper edge of the lens-board 44. To introduce the lens-board 44 into the lens-carrier, it is merely necessary to insert the upper edge thereof into the space behind the upper lip or projection 37. Upward pressure is then applied against the action of the spring 45 until the lower edge of said lens-board escapes or passes beyond the upper edge of the lower lip or projection 38, when said lower edge of the lens-board is forced and held downwardly by the spring 45 behind both of the lips or projections 37 and 38. Danger of accidental displacement of the same after thus inserted is thereby effectually avoided. To remove the lens-board 44, a reverse operation to that just described must be performed.

Having now described our invention, what we claim as new, and desire to secure by Letters Patent, is—

1. The combination with two parallel vertical guides forming part of a camera-front, having elongated slots therein, and racks along the sides of said slots, of a lens-carrier made in a single piece from sheet metal, having flanges around its edges forming a recess for the reception of the lens-board, and the two side flanges being bent outwardly and rearwardly to form wings which fit and are vertically movable within said guides and are extended downwardly at their lower ends to form ears, a rotary shaft mounted in said ears, and extending through said slots, and pinions on said shaft meshing with said racks.

2. The combination with two parallel, vertical guides forming part of a camera-front having elongated slots therein and inwardly-extending stops thereon, and racks along the sides of said slots, of a lens-carrier made in a single piece from sheet metal, having flanges around its edges forming a recess for the reception of the lens-board, and the two side flanges being bent outwardly and rearwardly to form wings whose upper ends are adapted to engage said stops and whose lower ends are extended downwardly to form ears, a rotary shaft mounted in said ears and extending through said slots, and pinions on said shaft meshing with said racks.

3. In a photographic camera, the combination with a lens-carrier secured to the forward end of the bellows, having a recess in its front surface and an overhanging lip along one side of said recess, of a lens-board corresponding in shape to said recess and adapted to fit therein with one edge behind said overhanging lip, and a spring for retaining said lens-board in place within said recess, the same being secured to said lens-carrier and having a projection on its free end with an inclined face which projects inwardly beyond one of the side walls of said recess and is adapted to engage the front surface of said lens-board.

In testimony whereof we have hereunto set our hands in presence of two subscribing witnesses.

JOHN A. ROBERTSON.
CHAS. E. HUTCHINGS.

Witnesses:
GEO. W. REILLY,
FRED D. MORGAN.